United States Patent Office 3,359,092
Patented Dec. 19, 1967

3,359,092
PROCESS FOR PLANT DEFOLIATION
Milton L. Dunham, Jr., Tonawanda, and Francis M. O'Connor, Kenmore, N.Y., assignors to Union Carbide Corporation, a corporation of New York
No Drawing. Original application Sept. 20, 1961, Ser. No. 139,370, now Patent No. 3,234,028, dated Feb. 8, 1966. Divided and this application Feb. 2, 1966, Ser. No. 538,879
2 Claims. (Cl. 71—70)

This application is a division of application S.N. 139,370, filed Sept. 20, 1961, now U.S. Patent No. 3,234,028.

This invention relates to agents for use in chemical reactions and processes for their use. More particularly the invention relates to agents from which materials can be released at an appropriate time to act as reactants or catalysts in chemical reactions. The agents of the invention may be used as carriers of aromas, defoliants, phamaceuticals, and bleaching agents for example.

It is an object of the present invention to provide an agent which contains materials that are to participate in or promote a chemical reaction and which retains these materials until their release is desired.

The objects of the invention are accomplished by adsorbing the appropriate material with a zeolitic molecular sieve. The resulting agent may be blended with other materials and their release controlled with the beneficial results which will appear from the examples and tests described below.

Zeolitic molecular sieves, both natural and synthetic, are metal-aluminum-silicates. The crystalline structure of these materials is such that a relatively large sorption area is present inside each crystal. Access to this area is by way of openings or pores in the crystal. Molecules are selectively adsorbed by molecular sieves on the basis of size and polarity among other things.

To facilitate an understanding of the terms used in the examples and claims appearing below, some of the synthetic zeolitic molecular sieves used in making the curing agent of the invention will be described. For convenience one of the synthetic molecular sieves used has been designated "zeolite X" and is described, together with a process for making it, in detail in United States patent application Ser. No. 400,389 filed Dec. 24, 1953, now U.S. Patent No. 2,882,244.

The general formula for zeolite X, expressed in terms of mol fractions of oxides is as follows:

$$0.9 \pm 0.2 M_{2/n}O : Al_2O_3 : 2.5 \pm 0.5 SiO_2 : 0 \text{ to } 8H_2O$$

In the formula M represents a metal and $n$ its valence. The zeolite is activated or made capable of adsorbing certain molecules by the removal of water from the crystal as by heating. Thus the actual number of mols of water present in the crystal will depend upon the degree of dehydration or activation of the crystal.

The metal represented in the formula above by the letter M can be changed by conventional ion exchange techniques. The sodium form of the zeolite, designated sodium zeolite X, is the most convenient to manufacture. For this reason the other forms of zeolite X are usually obtained by the modification of sodium zeolite X.

A typical formula for sodium zeolite X is $$0.9 Na_2O : Al_2O_3 : 2.5 SiO_2 : 6.1 H_2O$$

After activation by heating at least some of the water is removed from the zeolite X and it is then ready for use in preparing the agents of the invention.

The major lines in the X-ray diffraction pattern of sodium zeolite X are set forth in Table A below:

TABLE A

| $d$ value of reflection in A.: | 100 $I/I_o$ |
|---|---|
| 14.42±0.2 | 100 |
| 8.82±0.1 | 18 |
| 4.41±0.05 | 9 |
| 3.80±0.05 | 21 |
| 3.33±0.05 | 18 |
| 2.88±0.05 | 19 |
| 2.79±0.05 | 8 |
| 2.66±0.05 | 8 |

In obtaining the X-ray diffraction powder patterns, standard techniques were employed. The radiation was the K doublet of copper, and a Geiger counter spectrometer with a strip chart pen recorder was used. The peak heights, I, and the positions as a function of $2\theta$, where $\theta$ is the Bragg angle, were read from the spectrometer chart. From these, $d$(obs.), the interplanar spacing in A., corresponding to the recorded lines was calculated. The X-ray patterns indicate a cubic unit cell of dimensions between 24.5 A. and 25.5 A.

To make sodium zeolite X reactants are mixed in aqueous solution and held at about 100° C. until the crystals of zeolite X are formed. Preferably the reactants should be such that in the solution the following ratios prevail:

| $SiO_2/Al_2O_3$ | 3–5 |
|---|---|
| $Na_2O/SiO_2$ | 1.2–1.5 |
| $H_2O/Na_2O$ | 35–60 |

The manner in which zeolite X might be obtained is illustrated by the following: 10 grams of $NaAlO_2$, 32 grams of an aqueous solution containing by weight about 20% $Na_2O$ and 32% $SiO_2$, 5.5 grams NaOH and 135 cc. $H_2O$ were mixed and held in an autoclave for 47 hours at about 100° C. Crystalline zeolite X was recovered by filtering the reacted materials and washed with water until the pH of the effluent wash water is between 9 and 12. The crystals are dried after which they are ready for use in making the agent of the invention.

Another synthetic zeolitic molecular sieve which has been successfully used in preparing a curing agent according to the invention has been designated "zeolite A" and is described in detail together with processes for its preparation in United States patent application Ser. No. 400,388, filed Dec. 24, 1953, now U.S. Patent No. 2,882,243.

The general formula for zeolite A, expressed in terms of mol fractions of oxides is as follows:

$$1.0 \pm 0.2 M_{2/n}O : Al_2O_3 : 1.85 \pm 0.5 SiO_2 : 0 \text{ to } 6H_2O$$

In the formula M represents a metal, hydrogen, or ammonium, $n$ the valence of M. The amount of $H_2O$ present in zeolite A will of course depend on the degree of dehydration of the crystals.

As in the case of zeolite X and other zeolites, the element or group designated by M in the formula can be changed by conventional ion exchange techniques. Sodium zeolite A is the most convenient form to prepare and other forms are usually obtained from it by an exchange of ions in aqueous solutions. A typical formula for sodium zeolite A is 0.99

$$Na_2O : 1.0 Al_2O_3 : 1.85 SiO_2 : 5.1 H_2O$$

The removal of at least part of the water, as by heating, would be sufficient to prepare the sodium zeolite A for use in making the agent of the invention.

Using the techniques by which the X-ray diffraction data for sodium zeolite X was obtained, similar data for sodium zeolite A was obtained and is recorded in Table B.

TABLE B

| d value of reflection in A.: | $100 I/I_o$ |
|---|---|
| 12.2±0.2 | 100 |
| 8.6±0.2 | 69 |
| 7.05±0.15 | 35 |
| 4.07±0.08 | 36 |
| 3.68±0.07 | 53 |
| 3.38±0.06 | 16 |
| 3.26±0.05 | 47 |
| 3.96±0.05 | 55 |
| 2.73±0.05 | 12 |
| 2.60±0.05 | 22 |

To make sodium zeolite A reactants are mixed in aqueous solution and held at about 100° C. until crystals of sodium zeolite A are formed. The reactants should be such that in the solution the following ratios prevail:

| $SiO_2/Al_2O_3$ | 1.3–2.5 |
|---|---|
| $Na_2O/SiO_2$ | 0.8–3.0 |
| $H_2O/Na_2O$ | 35–200 |

An example of the manner in which zeolite A may be prepared is as follows: 80 grams of $NaAlO_2$, 126 grams of an aqueous solution of sodium silicate containing about 7.5% by weight $Na_2O$ and 25.8% by weight $SiO_2$, and 320 cubic centimeters of $H_2O$ were placed in an autoclave. In the autoclave the following ratios prevailed: $SiO_2/Al_2O_3$—1.2; $Na_2O/SiO_2$—1.2, and $H_2O/Na_2O$—36. The contents of the autoclave were held at about 100° C. for about 12 hours. Crystalline zeolite A was recovered by filtration and washed with distilled water until the effluent wash water had a pH of between 9 and 12. After drying and dehydration the crystals are ready for use in making the agents of the invention.

The manner in which the agents of the invention may be made and used can be seen from the following examples.

*Example I*

Ethylene is known to effect the defoliation of cotton plants. Difficulties are experienced in applying ethylene to the plants. The problem can be solved with the agents of the invention.

A sample of sodium zeolite A was dehydrated and ethylene was introduced into a chamber containing the dehydrated zeolite. Ethylene was adsorbed by the zeolite. Cotton plants were placed under a jar with one gram of the sample which contained 5.8 weight-percent adsorbed ethylene. The plant was completely defoliated in four days indicating gradual and effective release of the ethylene.

Ethylene is known to be effective as a ripening agent for bananas. The control of this ripening process can be improved by using the agents of the invention as will be seen in Example II.

*Example II*

Green bananas were placed in polyethylene bags, which included a small quantity of zeolite A containing ethylene. The bags were stored in the dark for two weeks at 10° C. The bananas showed evidence of ripening greater than did bananas stored under the same conditions out of the presence of ethylene. The controlled release of the ripening agent, ethylene, was demonstrated by this test.

Because molecular sieves will adsorb vapors and retain them for long periods of time or until released by heating or otherwise, the molecular sieves are useful in retaining aromas until their release is desired. In Example III the adsorption and release of an aroma with a number of molecular sieves and the release of the aroma by a number of means are described.

*Example III*

Pellets of sodium zeolite A, pellets of calcium zeolite A and pellets of sodium zeolite X were each activated and subjected to a stream of gases carrying the aroma emitted from roasted coffee grounds. Samples of each type of pellet were then held in a stream of carbon dioxide. The carbon dioxide was adsorbed by the molecular sieves releasing the coffee aroma in each instance. Similar results were obtained when moist air was passed over the aroma laden crystals.

The use of molecular sieves to hold aromas until their release is desired can of course be employed in products other than coffee. For example, the presence of molecular sieves, laden with the aroma of cooked food, can be advantageously added to dehydrated food products. Perfume or the like adsorbed by the molecular sieves can be placed in soap where it will be released when the soap and the molecular sieve are wetted. Similarly, a perfume or aroma in a molecular sieve can be released by the burning of a wax candle which contains the treated molecular sieve.

Pharmaceutical agents can be adsorbed on molecular sieves and their application and effectiveness improved. Agents which have a germicidal effect on bacteria causing "athlete's foot" can be adsorbed by the molecular sieve and dusted over the infected skin area. As the sieve adsorbs moisture from the body, the germicidal agent is released. In addition to supplying a germicide the preparation tends to effect the drying of the skin. This drying action might also be used in the treatment of burns. Fumigants such as hydrogen sulfide can be adsorbed and released slowly where and when needed by the application of moisture to the molecular sieve.

The adsorptive capacity of the molecular sieves for bleaching agents, such as chlorine and hydrogen peroxide, make them useful in the bleaching of many materials, for example paper, where moisture is present to desorb the bleaching agent.

The agents of the invention may also be employed to introduce normally gaseous materials into liquid fuels. Butane, for example, may be adsorbed and entrained in gasoline or kerosene. The butane will be released by the heat of the combustion of the fuel.

These examples of the use of the agents of the invention serve to illustrate the manner in which they might be used. Molecular sieves other than those mentioned in the specification may be satisfactorily employed within the scope of the invention. Chabazite, mordenite and faujasite are examples of naturally occurring molecular sieves that perform satisfactorily in the practice of the invention.

What is claimed is:

1. A process for plant defoliation of a plant susceptible to defoliation by contact with ethylene comprising the steps of adsorbing ethylene on dehydrated crystalline zeolitic molecular sieve, contacting a defoliating amount of the ethylene-containing molecular sieve with moisture-containing air in the immediate proximity of said plant thereby controllably releasing substantially all of said ethylene from said molecular sieve for contact with and defoliation of said plant.

2. A process according to claim 1 in which zeolite A is said crystallite zeolitic molecular sieve and cotton is said plant.

References Cited

UNITED STATES PATENTS

| 2,245,867 | 6/1941 | Mehrlich | 71—2.4 |
| 2,358,882 | 9/1944 | Rohrbavgh | 71—2.4 X |
| 2,882,243 | 4/1959 | Milton. | |
| 3,036,980 | 5/1962 | Dunham et al. | 260—31.4 |

OTHER REFERENCES

Ahlgren et al.: Principles of Weed Control, J. Wiley & Sons, New York, 1951, p. 272.

Seeliger, Chemical Abstracts, vol. 16, pp. 1170 and 1171.

JAMES O. THOMAS, JR., *Primary Examiner.*